(12) United States Patent
Dantinne et al.

(10) Patent No.: US 10,994,356 B2
(45) Date of Patent: May 4, 2021

(54) WELDING DEVICE FOR REMOTELY CONTROLLING WELDING POWER SUPPLY SETTINGS

(71) Applicant: Illinois Tool Works Inc., Glenview, IL (US)

(72) Inventors: Markus M. Dantinne, Combined Locks, WI (US); Edward G. Beistle, Appleton, WI (US); Michael W. Roth, Appleton, WI (US); Anthony VanBergen Salsich, Appleton, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 205 days.

(21) Appl. No.: 16/222,593

(22) Filed: Dec. 17, 2018

(65) Prior Publication Data
US 2019/0118282 A1    Apr. 25, 2019

Related U.S. Application Data

(63) Continuation of application No. 13/799,676, filed on Mar. 13, 2013, now Pat. No. 10,155,277.

(60) Provisional application No. 61/656,154, filed on Jun. 6, 2012.

(51) Int. Cl.
*B23K 9/10* (2006.01)
*B23K 9/095* (2006.01)

(52) U.S. Cl.
CPC ............ *B23K 9/095* (2013.01); *B23K 9/0953* (2013.01); *B23K 9/10* (2013.01); *B23K 9/1087* (2013.01)

(58) Field of Classification Search
CPC .......... B23K 9/0953–0956; B23K 9/10; B23K 9/1087; B23K 9/1006–1075
See application file for complete search history.

(56) References Cited

U.S. PATENT DOCUMENTS

| | | | | |
|---|---|---|---|---|
| 2004/0045945 | A1* | 3/2004 | Shimogama | B23K 9/1062 219/130.5 |
| 2005/0016975 | A1* | 1/2005 | Reynolds | B23K 9/1087 219/132 |
| 2005/0230372 | A1* | 10/2005 | Ott | B23K 9/1087 219/132 |
| 2006/0138113 | A1* | 6/2006 | Ott | B23K 9/125 219/132 |
| 2011/0073569 | A1* | 3/2011 | Rappl | B23K 9/1006 219/73.2 |

FOREIGN PATENT DOCUMENTS

CN            102074105            5/2011

\* cited by examiner

*Primary Examiner* — Michael A Laflame, Jr.
(74) *Attorney, Agent, or Firm* — McAndrews, Held & Malloy, Ltd.

(57) ABSTRACT

A welding device for remotely controlling welding power supply settings is provided. One embodiment of the welding device includes a welding pendant having a control panel configured to control a plurality of settings of a welding power supply. The control panel is not part of the welding power supply and the plurality of settings includes a welding current output by the welding power supply. The welding pendant also includes a welding power input configured to receive welding power and data from the welding power supply via a welding power cable. The welding power is combined with the data such that the data is provided over the welding power cable.

20 Claims, 2 Drawing Sheets

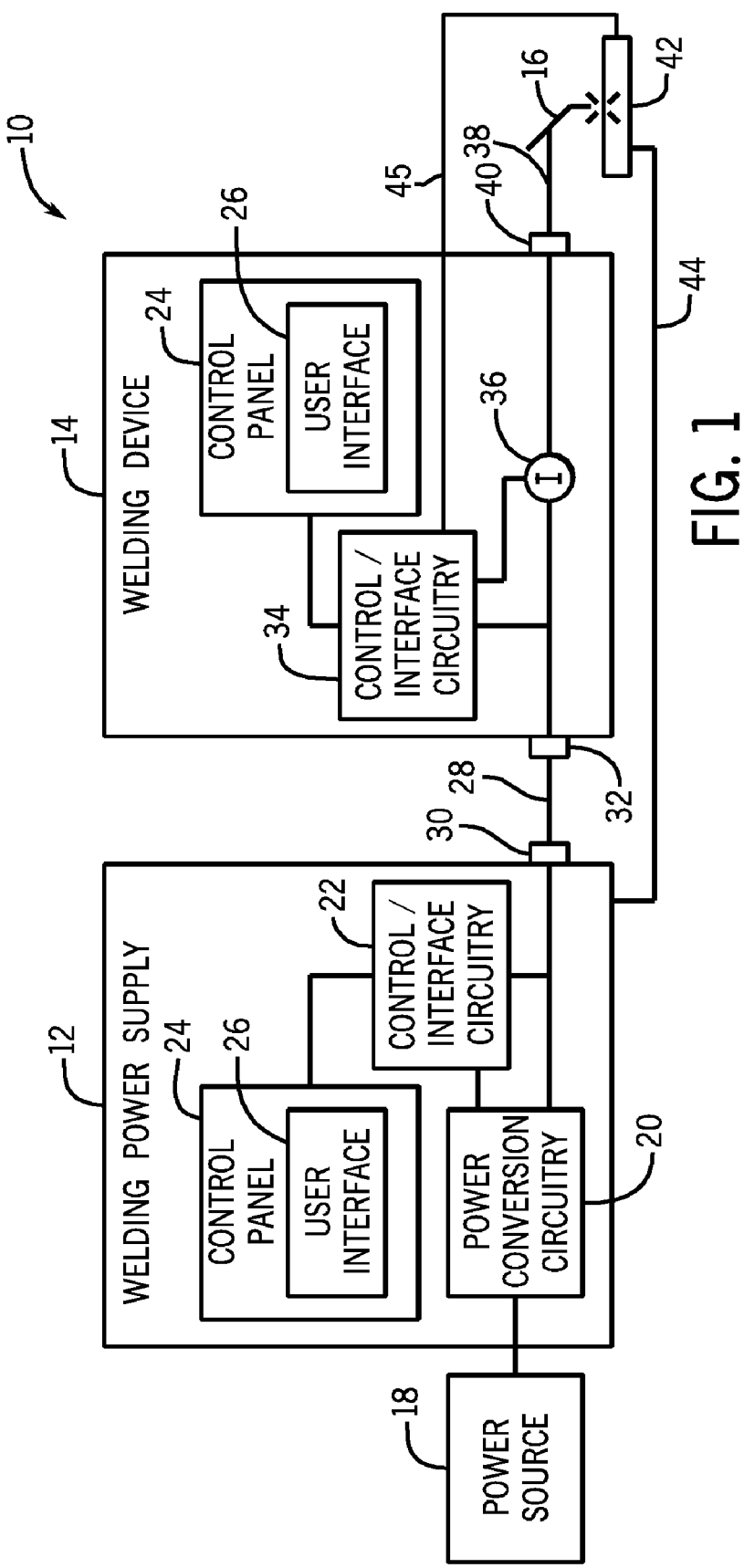
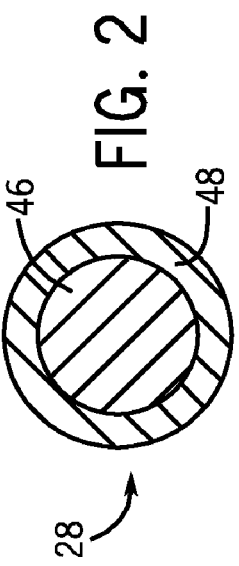
FIG. 1
FIG. 2

WELDING DEVICE FOR REMOTELY CONTROLLING WELDING POWER SUPPLY SETTINGS

CROSS REFERENCE TO RELATED APPLICATIONS

The present application is a continuation and claims priority of U.S. patent application Ser. No. 13/799,676, filed on Mar. 13, 2013 and entitled "Welding device for Remotely Controlling Welding Power Supply Settings," which issued as U.S. Pat. No. 10,155,277 on Dec. 18, 2018, which is a Non-provisional U.S. patent application of U.S. Provisional Application No. 61/656,154, entitled "Welding Device for Remotely Controlling Welding Power Supply Settings", filed Jun. 6, 2012, all of which are hereby incorporated by reference in their entireties.

BACKGROUND

The invention relates generally to welding applications and, more particularly, to a welding device for remotely controlling welding power supply settings.

Welding is a process that has increasingly become utilized in various industries and applications. Such processes may be automated in certain contexts, although a large number of applications continue to exist for manual welding operations. In both cases, such welding operations rely on a variety of types of equipment to ensure the supply of welding consumables (e.g., wire feed, shielding gas, etc.) is provided to the weld in appropriate amounts at the desired time. Certain welding operations may be performed in locations that are remote from a welding power supply. Accordingly, accessing the welding power supply from the location of the welding operation may not be possible. Furthermore, time and resources may be wasted in moving between the location of the welding operation and the location of the welding power supply.

A variety of remote controls and pendants have been developed that allow for a certain degree of control of weld parameters from remote locations without requiring the operator (or an assistant) to return to the welding power supply. However, these have typically been either wired via a control cable (thus requiring a further long run of cabling, increasing cost, weight, and potential for loss of signals), or wireless (with all of the benefits and limitations of wireless communication in difficult work environments). There is a need, therefore, for improved techniques allowing for weld parameter adjustment from remote welding locations.

BRIEF DESCRIPTION

In one embodiment, a welding pendant includes a control panel configured to control a plurality of settings of a welding power supply. The control panel is not part of the welding power supply and the plurality of settings includes a welding current output by the welding power supply. The welding pendant also includes a welding power input configured to receive welding power and data from the welding power supply via a welding power cable. The welding power is combined with the data such that the data is provided over the welding power cable.

In another embodiment, a welding pendant includes a welding power input configured to receive welding power and data from a welding power supply via a welding power cable. The welding power is combined with the data such that the data is provided over the welding power cable. The welding pendant also includes a welding power output configured to provide the welding power to a welding torch. The welding pendant includes a current sensor configured to monitor welding current of the welding power flowing between the welding power input and the welding power output.

In another embodiment, a welding device includes a control panel configured to control a plurality of settings of a welding power supply. The control panel is not part of the welding power supply and the plurality of settings includes at least the settings available at the welding power supply. The welding device also includes a welding power input configured to receive welding power and data from the welding power supply via a welding power cable. The welding power is combined with the data such that the data is provided over the welding power cable.

DRAWINGS

These and other features, aspects, and advantages of the present invention will become better understood when the following detailed description is read with reference to the accompanying drawings in which like characters represent like parts throughout the drawings, wherein:

FIG. 1 is a block diagram of an embodiment of a welding system including a welding power supply and a welding device for remotely controlling the welding power supply settings, in accordance with aspects of the present disclosure;

FIG. 2 is a cross-sectional view of an embodiment of a welding power cable of FIG. 1, in accordance with aspects of the present disclosure.

DETAILED DESCRIPTION

Figure 3:
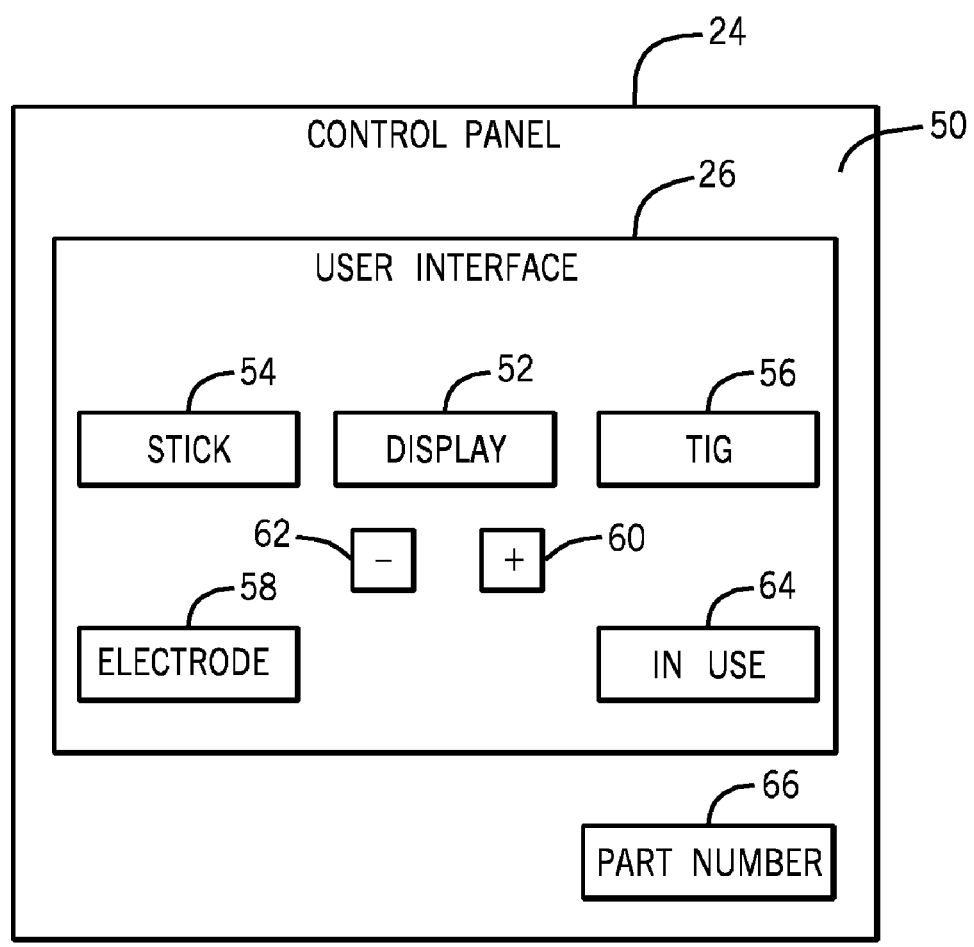
FIG. 3 is a block diagram of an embodiment of a control panel of FIG. 1, in accordance with aspects of the present disclosure.

One or more specific embodiments of the present disclosure will be described below. These described embodiments are only examples of the present disclosure. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Turning now to the figures, FIG. 1 is a block diagram of an embodiment of a welding system 10 including a welding power supply 12 and a welding device 14 for remotely controlling the welding power supply 12 settings. The welding system 10 powers, controls, and provides supplies to a welding operation. The welding power supply 12 provides welding power that is used by a torch 16 to perform the welding operation. The welding power supply 12 receives input power from a power source 18 (e.g., from the AC power grid, an engine/generator set, a battery, or a combination thereof), conditions the input power, and provides an output power to one or more welding devices in accordance with demands of the system 10. The input power may be supplied from an offsite location (i.e., the input power may originate from a wall outlet). The welding power source 12 includes power conversion circuitry 20 that may include circuit elements such as transformers, rectifiers, switches, and so forth, capable of converting the AC input power to a DCEP or DCEN output as dictated by the demands of the system 10.

In some embodiments, the power conversion circuitry 20 may be configured to convert the input power to both weld and auxiliary power outputs. However, in other embodiments, the power conversion circuitry 20 may be adapted to convert input power only to a weld power output, and a separate auxiliary converter may be provided to convert primary power to auxiliary power. Still further, in some embodiments, the welding power supply 12 may be adapted to receive a converted auxiliary power output directly from a wall outlet. Indeed, any suitable power conversion system or mechanism may be employed by the welding power supply 12 to generate and supply both weld and auxiliary power.

The welding power supply 12 includes control/interface circuitry 22. The control/interface circuitry 22 controls the operations of the welding power supply 12 and may receive input from a control panel 24 having a user interface 26 through which a user may choose a process, and input desired parameters (e.g., voltages, currents, particular pulsed or non-pulsed welding regimes, and so forth). The control/interface circuitry 22 may also be configured to receive and process a plurality of inputs regarding the performance and demands of the system 10. Furthermore, the control/interface circuitry 22 may provide data (e.g., using power line communication) relating to the operation of the welding power supply 12 to other welding devices (e.g., the welding device 14) in the system 10. The control/interface circuitry 22 may include volatile or non-volatile memory, such as ROM, RAM, magnetic storage memory, optical storage memory, or a combination thereof. In addition, a variety of control parameters may be stored in the memory along with code configured to provide a specific output (e.g., initiate wire feed, enable gas flow, etc.) during operation.

Data and welding power are provided from the welding power supply 12 to the welding device 14 via a welding power cable 28. Specifically, the data is carried by the welding power using power line communication (e.g., the welding power and the data are provided on the same electrical conductor, the data is provided using a modulated signal carried by the welding power, the data and the welding power are combined together). The power line communication may operate as described in U.S. patent application Ser. No. 12/843,321, entitled "Welding System with Power Line Communication," filed Jul. 26, 2010, which is hereby incorporated by reference in its entirety. Accordingly, data and welding power flow through an output 30 of the welding power supply 12. Furthermore, data and welding power flow through an input 32 of the welding device 14.

The welding device 14 may be any suitable welding device. For example, the welding device 14 may be a pendant (e.g., not a wire feeder), a remote control, a wire feeder, and so forth. In other embodiments, the welding device 14 may be replaced by an induction heating device. The welding device 14 includes control/interface circuitry 34 that controls the operations of the welding device 14 and may receive input from the control panel 24 having the user interface 26 through which a user may choose a process, and input desired parameters (e.g., voltages, currents, particular pulsed or non-pulsed welding regimes, and so forth). As illustrated, the control panel 24 of the welding device 14 is the same as the control panel 24 of the welding power supply 12, but the control panel 24 of the welding device 14 is not part of the welding power supply 12. However, in certain embodiments, the control panel of the welding device 14 may not be the same as the control panel of the welding power supply 12.

The control/interface circuitry 34 may also be configured to receive and process a plurality of inputs regarding the performance and demands of the system 10. Furthermore, the control/interface circuitry 34 may provide data (e.g., using power line communication) relating to the operation of the welding device 14 to other welding devices (e.g., the welding power supply 12) in the system 10. The control/interface circuitry 34 may include volatile or non-volatile memory, such as ROM, RAM, magnetic storage memory, optical storage memory, or a combination thereof. In addition, a variety of control parameters may be stored in the memory along with code configured to provide a specific output (e.g., initiate wire feed, enable gas flow, etc.) during operation.

As illustrated, a first control panel 24 is part of the welding power supply 12 and a second control panel 24 is part of the welding device 14. The control panels 24 may individually be used to control multiple settings (e.g., all of the user adjustable settings) of the welding power supply 12. Moreover, the control panels 24 in each of the welding power supply 12 and the welding device 14 may be the same such that each of the control panels 24 has the same part number, the same layout, the same functionality, the same interface, the same display, and/or are duplicates of each other, for example. Accordingly, the control panels 24 are interchangeable such that the control panel 24 may be removed from the welding power supply 12 and used to replace the control panel 24 of the welding device 14, and/or vice versa. Furthermore, where the control panel 24 of the welding power supply 12 may be used to control every user configurable feature of the welding power supply 12, the control panel 24 of the welding device 14 may be used to control every user configurable feature of the welding power supply 12. For example, the control panels 24 of both the welding power supply 12 and the welding device 14 may be used to configure a welding process (e.g., stick welding, tungsten inert gas (TIG) welding, metal inert gas (MIG) welding, and so forth), a stick electrode type, a current setting of the welding power supply 12, and/or a maximum welding current output by the welding power supply 12 (e.g., the maximum current limit of the welding power supply 12). Moreover, in some embodiments, the control panel 24 of the welding device 14 may have more settings available than the control panel 24 of the welding power supply 12. Accordingly, more features may be configurable using the control panel 24 of the welding device 14 than are configurable using the control panel 24 of the welding power supply 12.

As may be appreciated, configuring the welding process and/or the stick electrode type may alter a voltage output, current output, or some other output from the welding power supply 12. Furthermore, the ability to adjust the maximum welding current output by the welding power supply 12 (e.g., the maximum current limit) has previously been limited to the welding power supply 12. However, in the present embodiment, the welding device 14 may remotely change not only an operating current, but the maximum current limit of the welding power supply 12. Accordingly, being able to configure these settings from the welding device 14 may improve efficiency by allowing remote configuration so that an operator does not have to go to the welding power supply 12 each time a setting change is desired.

In the present embodiment, the welding device 14 includes a current monitor 36. As may be appreciated, the current monitor 36 may be any suitable device that monitors the current flowing through the welding device 14. For example, the current monitor 36 may include a transformer, a resistor, a current clamp, a Hall effect IC, a fiber optic current sensor, a Rogowski coil, and so forth. Furthermore, the current monitor 36 may be monitored and displayed on a display of the control panel 24. By monitoring the current at the welding device 14, the welding current may be monitored closer to the location of welding than if the welding current were monitored at the welding power supply 12. It should be noted that in certain embodiments, welding current may be obtained from the welding power supply 12. However, when using power line communication it may be difficult to provide welding current data while a welding operation is being performed. Accordingly, with the current monitor 36, the welding current may be provided to the welding device 14 at any time including while a welding operation is being performed.

A weld cable 38 provides welding power to the torch 16. As illustrated, the weld cable 38 is coupled to an output 40 of the welding device 14. In certain embodiments, the weld cable 38 may also provide shielding gas to a welding operation. A workpiece 42 is also coupled to the welding power supply 12 via a work cable 44 to enable a welding arc to be formed by providing a return path for welding power. Furthermore, as illustrated, a work sense cable 45 couples the control/interface circuitry 34 of the welding device 14 to the workpiece 42 to provide a complete circuit for powering the welding device 14.

FIG. 2 is a cross-sectional view of an embodiment of the welding power cable 28 of FIG. 1. As illustrated, the welding power cable 28 includes a single electrical conductor 46 that carries welding power and data together (e.g., via power line communication). As may be appreciated, the electrical conductor 46 may be a single wire or a bundle of non-insulated wires (e.g., twisted wires). An insulator 48 surrounds and insulates the electrical conductor 46.

FIG. 3 is a block diagram of an embodiment of the control panel 24 of FIG. 1. As described above, the control panel 24 is designed to be used in, and interchangeable between, the welding power supply 12 and the welding device 14. The control panel 24 includes a housing 50 used to secure the control panel 24 to the welding power supply 12, or the welding device 14. The user interface 26 is formed within the housing 50. Furthermore, the user interface 26 may include any suitable devices for receiving inputs from an operator and providing feedback to the operator. For example, the user interface 26 may include buttons, switches, touch screens, displays, and so forth.

In the illustrated embodiment, the user interface 26 includes a display 52 for showing data such as a monitored welding current (e.g., the welding current monitored by the welding device 14), a weld current setting, a voltage setting, an operating mode, and so forth. Moreover, the display 52 may be any suitable display. The user interface 26 also includes interface devices 54, 56, 58, 60, 62, and 64. The interface devices 54, 56, 58, 60, 62, and 64 may be used for inputting data, outputting data, or a combination of the two. For example, the interface device 54 may include a button that if pressed selects a stick welding mode. Furthermore, the interface device 54 may include an output (e.g., an LED) to indicate that the welding power supply 12 is set to the stick welding mode. As another example, the interface device 56 may include a button that if pressed selects a TIG welding mode. Furthermore, the interface device 56 may include an output (e.g., an LED) to indicate that the welding power supply 12 is set to the TIG welding mode. In addition, the interface device 58 may be used to set a type of welding electrode. As a further example, the interface devices 60 and 62 may be used to increase and/or decrease settings, respectively. The interface device 64 may provide an indication that a welding operation is being performed. As illustrated, the control panel 24 may include a part number 66. As previously described, the control panels 24 of the welding power supply 12 and the welding device 14 may have the same part number 66. Accordingly, the control panels 24 of the welding power supply 12 and the welding device 14 may be interchangeable.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding pendant comprising:
a control panel configured to control a plurality of settings of a welding power supply, wherein the control panel is physically interchangeable with a welding power supply control panel of the welding power supply; and
an input configured to receive welding power from the welding power supply and communicate data with the welding power supply via a welding power cable.

2. The welding pendant of claim 1, wherein the data is carried on an electrical conductor of the welding power cable, said electrical conductor also carrying power from the welding power supply to the welding pendant.

3. The welding pendant of claim 1, wherein the data includes control signals to control the plurality of settings of the welding power supply.

4. The welding pendant of claim 1, further comprising a power output configured to provide welding power to a welding torch.

5. The welding pendant of claim 4, further comprising a current sensor configured to monitor welding current of the welding power flowing between the power input and the power output.

6. The welding pendant of claim 5, wherein the control panel comprises a display configured to display the welding current monitored by the current sensor.

7. The welding pendant of claim 1, wherein the plurality of settings of the welding power supply comprises a selection of one of a plurality of welding processes.

8. The welding pendant of claim 7, wherein the plurality of welding processes comprises one of a tungsten inert gas (TIG) welding process, a stick welding process, or a metal inert gas (MIG) process.

9. The welding pendant of claim 1, wherein the plurality of settings of the welding power supply comprises a maximum welding current output limit setting of the welding power supply.

10. The welding pendant of claim 1, wherein the control panel is configured to enable selection of a stick electrode type.

11. The welding pendant of claim 1, wherein the control panel comprises a display configured to display at least one of the plurality of settings of the welding power supply.

12. A welding-type device comprising:

a control panel configured to control a plurality of settings of a welding-type power supply, wherein the control panel is physically interchangeable with a welding-type power supply control panel of the welding-type power supply; and an input configured to receive welding-type power from the welding-type power supply and communicate data with the welding-type power supply via a welding-type power cable.

13. The welding-type device of claim 12, wherein the welding-type device is a wire feeder.

14. The welding-type device of claim 12, wherein the welding-type device is an induction heating device.

15. The welding-type device of claim 12, wherein the data is carried on an electrical conductor of the welding-type power cable, said electrical conductor also carrying power from the welding-type power supply to the welding-type device.

16. The welding-type device of claim 12, wherein the data includes control signals to control the plurality of settings of the welding-type power supply.

17. A control panel physically insertable into one or more of a welding-type power supply and a welding-type device, wherein the control panel is configured to control a plurality of welding-type power supply settings when inserted into the welding-type power supply or the welding-type device.

18. The control panel of claim 17, wherein the welding-type device is a welding pendant.

19. The control panel of claim 17, wherein the welding-type device is a wire feeder.

20. The control panel of claim 17, wherein the welding-type device is an induction heating device.

* * * * *